(12) United States Patent
Carson et al.

(10) Patent No.: US 7,606,794 B2
(45) Date of Patent: Oct. 20, 2009

(54) ACTIVE ABSTRACTS

(75) Inventors: Chad Carson, Redwood City, CA (US); Douglas M. Cook, San Francisco, CA (US); Kalpana Ravinarayanan, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 341 days.

(21) Appl. No.: 11/169,521

(22) Filed: Jun. 28, 2005

(65) Prior Publication Data

US 2006/0101003 A1    May 11, 2006

Related U.S. Application Data

(63) Continuation-in-part of application No. 11/150,045, filed on Jun. 10, 2005, and a continuation-in-part of application No. 11/150,369, filed on Jun. 10, 2005.

(60) Provisional application No. 60/627,254, filed on Nov. 11, 2004, provisional application No. 60/627,189, filed on Nov. 11, 2004.

(51) Int. Cl.
 *G06F 17/30* (2006.01)

(52) U.S. Cl. .................. 707/3; 707/2; 707/4; 707/5; 707/10; 707/100; 709/218; 709/224; 709/246

(58) Field of Classification Search .............. 707/1, 707/2, 3, 4, 5, 10, 100; 709/218, 224, 246
See application file for complete search history.

(56) References Cited

U.S. PATENT DOCUMENTS

| 5,838,682 | A | 11/1998 | Dekelbaum et al. |
|---|---|---|---|
| 6,122,647 | A | 9/2000 | Horowitz et al. |
| 6,295,542 | B1 | 9/2001 | Corbin |
| 6,772,139 | B1 | 8/2004 | Smith |
| 7,032,030 | B1 | 4/2006 | Codignotto |
| 7,065,708 | B2 * | 6/2006 | Ono et al. ............... 715/236 |
| 7,152,064 | B2 * | 12/2006 | Bourdoncle et al. ........ 707/5 |
| 7,233,950 | B2 | 6/2007 | Smith |

(Continued)

FOREIGN PATENT DOCUMENTS

EP    1 182 581 A1    2/2002

OTHER PUBLICATIONS

"Yahoo Advanced Web Search" XP-002373131 retrieved from the Internet: URL:http://web.archive.org/web/20040317082739/www.yahoo.com/_ylh=X3oDMTF1M3BpbmVwBF9HA2dsb2Jhb F9ncm91cARfUwMyNzE2MTQ5BHR1c3QDMARObXBsA25z LWJ1dGGE-/r/so> retrieved on Mar. 17, 2004.

(Continued)

*Primary Examiner*—Shahid A Alam
*Assistant Examiner*—Phong Nguyen
(74) *Attorney, Agent, or Firm*—Hickman Palermo Truong & Becker LLP

(57) ABSTRACT

Techniques are provided for generating search results that include, instead of or in addition to the traditional abstract links, other links to content that the user of a search engine may consider helpful. These other links are referred to herein as "non-traditional abstract links". In general, the search engine generates non-traditional abstract links that attempt to anticipate the "next move" by the search engine user. By selecting a non-traditional abstract link from the abstract of a matching resource, the user is able to navigate from the search result listing directly to locations other than the top of a matching resource.

30 Claims, 10 Drawing Sheets

U.S. PATENT DOCUMENTS

| | | | |
|---|---|---|---|
| 7,467,131 | B1 | 12/2008 | Gharachorloo et al. |
| 7,505,969 | B2 | 3/2009 | Musgrove et al. |
| 2002/0065820 | A1 | 5/2002 | Enns |
| 2002/0091684 | A1 | 7/2002 | Nomiyama et al. |
| 2003/0225755 | A1 | 12/2003 | Iwayama et al. ............... 707/3 |
| 2004/0054973 | A1 | 3/2004 | Yamamoto |
| 2004/0064442 | A1 | 4/2004 | Popovitch |
| 2004/0064447 | A1 | 4/2004 | Simske et al. |
| 2004/0073538 | A1* | 4/2004 | Leishman et al. ............... 707/3 |
| 2005/0071328 | A1* | 3/2005 | Lawrence ...................... 707/3 |
| 2005/0131884 | A1 | 6/2005 | Gross et al. |
| 2005/0149576 | A1 | 7/2005 | Marmaros et al. |
| 2006/0069670 | A1* | 3/2006 | Khaliq et al. ................... 707/3 |
| 2006/0074868 | A1 | 4/2006 | Khaliq et al. |
| 2006/0080303 | A1 | 4/2006 | Sargent et al. |
| 2006/0101012 | A1 | 5/2006 | Carson et al. .................. 707/4 |
| 2007/0016848 | A1 | 1/2007 | Rosenoff et al. |
| 2007/0192289 | A1* | 8/2007 | Lin et al. ....................... 707/3 |
| 2007/0248220 | A1 | 10/2007 | Crandell et al. |

OTHER PUBLICATIONS

"Notification of Transmittal of the International Search Report and the Written Opinion of the International Searching Authority, or the Declaration" received in related International application No. PCT/US2005/040831.

"Notification of Transmittal of the International Search Report and the Written Opinion of the International Searching Authority, or the Declaration" received in related International application No. PCT/US2005/041074.

International Searching Authority, "Written Opinion of The International Searching Authority", international application No. PCT/US2005/040831, dated May 24, 2007, 7 pages.

Claims, international application No. PCT/US2005/040831, 4 pages.

International Searching Authority, "Written Opinion of The International Searching Authority", international application No. PCT/US2005/041074, dated May 24, 2007, 7 pages.

Claims, international application No. PCT/US2005/041074, 4 pages.

Ackerman et al., "Selected Search Engines and Meta-Search Tools on the World Wide Web", Franklin, Beedle and Associates Inc., 2003, 5 pages.

Jones et al., "Topic-Based Browsing within Digital Library Using Keyphrases", AMC 1999, retrieved from internet: http://portal.acm.org/citation.cfm?id+313238.313279, 8 pages.

* cited by examiner

10. The Harry Potter Collection @ eBay
...8 auction items found for the Harry Potter Collection by J.K. Rowling ... Harry Potter 1-5 w/Slipcase-NEW! (ends: Mar-01-05, Buy It Now! $28.00) ... Harry Potter Boxed Set ....
See results sorted: newly listed, ending soonest, lowest price first ...
http://project.ebay.com/The-Harry-Potter-Collection_ ... - 38k - Cached - More from this site

⎫
⎬ 402
⎭

8. MP3 Shuffle on eBay
Bid on MP3 Shuffle at eBay ... 111 items found for mp3 shuffle ... NEW IPOD SHUFFLE 512MB
MP3 PLAYER (ends: Feb-03-05, Buy it Now! $123.99).
eBay Categories: Consumer Electronics (16347) | MP3 Players & Accessories (6356) | More ...
search-desc.ebay.com/search/search.dll?query=mp3+shuffle&newu = 1&krd=1 - More from this site
                                                                  ⌣ 408

⎫
⎬ 404
⎭

8. MP3 Shuffle on eBay
Bid on MP3 Shuffle at eBay ... 111 items found for mp3 shuffle ... NEW IPOD SHUFFLE 512MB
MP3 PLAYER (ends: Feb-03-05, Buy it Now! $123.99).
See listings sorted: newly listed, ending soonest, lowest price first
search-desc.ebay.com/search/search.dll?query=mp3+shuffle&newu = 1&krd=1 - More from this site
                                                                  ⌣ 410

8. MP3 Shuffle on eBay
   Bid on MP3 Shuffle at eBay ... 98 items between *$0.01 and $11.99 for mp3 shuffle* .... NEW IPOD
   SHUFFLE 512MB MP3 PLAYER *(ends: Feb-03-05, Buy It Now! $123.99)* ...
   See listings sorted: newly listed, ending soonest, lowest price first
   search-desc.ebay.com/search/search dll?query=mp3+shuffle&newu = 1&krd=1 - More from this site

502

8. MP3 Shuffle on eBay
   Bid on MP3 Shuffle at eBay ... 98 items between *$0.01 and $11.99 for mp3 shuffle* .... NEW IPOD
   SHUFFLE 512MB MP3 PLAYER *(ends: Feb-03-05, Buy It Now! $123.99)* ...
   eBay Categories: Consumer Electronics (16324) | MP3 Players & Accessories (6342) | More ...
   search-desc.ebay.com/search/search dll?query=mp3+shuffle&newu = 1&krd=1 - More from this site

Example 1: (Direct links in abstracts to the most popular reviews)
Digital Camera & Photography: Reviews, News, Forums, Glossary FAQ
Digital Photography Review: All the latest digital camera reviews and digital imaging news ... The DSC-P150 is
Sony's latest salvo in the megapixel wars, and the first truly compact 7 megapixel camera ...
Reviews: Sony DSC P150, Canon S1 IS, Canon EOS 300D, More ...
www.dpreview.com - More from this site Example 2: (Site navigation)
Sony Electronics: Official Online Store
Find over 1,000 Sony Products including: VAIO Desktops, VAIO Notebooks, Digital Cameras, Camcorders,
Televisions, Home Audio/Video, and more ...
www.sonystyle.com - More from this site)

Example 3: (Targeted deep link extraction)                                                602

Sony Electronics: Official Online Store
604 Find over 1,000 Sony Products including: VAIO Desktops, VAIO Notebooks, Digital Cameras, Camcorders,
Televisions, Home Audio/Video, and more ...
Digital Cameras: Cybershot Pro, Cybershot Point & Shoot, Mavica, More ...
www.sonystyle.com - More from this site)

Example 4: (Vertical integration: Maps)
PlacesToStay.com - Nite Inn @ Universal City in Studio City, California
606 ... Nite Inn @ Universal City Studio City - Find and reserve a room at a huge ...Nite Inn @ Universal City, Studio
City, California, reservation, booking, accomodation...
10612 Ventura Blvd., Studio City, CA 91604 | Photos | More ...
www.placestostay.com/hotel html? hotel_id=36613 - More from this site Example 5: (Comparison Shopping)
Find Top Rates for California Near Studio Universal Hotels at Nextag
608 Visit NexTag for the best prices on top hotels. Compare rates, browse hotel details, user ratings and reviews for
California Near Studio Universal Hotels.
Ramada Hotel - $80, Days Inn Hollywood - $74, Comfort Inn, Downey - $65, More ...
nextag.com/goto.jsp? search=california+hotel+...&p=169%26node-2703100 - More from this site Example 6: (Auctions)
                                                                                          610
MP3 Shuffle on eBay
Bid on MP3 Shuffle at eBay ... 111 items found for mp3 shuffle ...
Apple iPod Shuffle 1GB MP3 player ends Feb-03-05 09:00:00 PST, ends Feb-03-05 11:09:27 PST, More ...
Also try: *shuffle* in Consumer Electronics > MP3 Portable Audio > MP3 Players (263 items)
search.desc.ebay.com/search/search.dll?query=mp3+shuffle&newu = 1&krd=1 - More from this site

FIG. 6

5. Thai Basil
   includes profile on Thai food and menu.
   Thai Restaurant @ 101 S. Murphy Ave Sunnyvale, CA 94086 - Map - (408) 772-1098 — 702
   www.thaibasil.com - 1k - Cached - More from this site

FIG. 7

1. Four Seasons Hotel San Francisco: A Luxury Hotel in San Francisco, California — 804
   (San Francisco, California) Four Seasons is the world's leading operator of luxury hotels and resorts. Visit
   our site to plan your vacation, getaway, or business travel to San Francisco, CA....
   757 Market Street, San Francisco - Map - (415)633-3000 - Send to Phone - Weather
   www.fourseasons.com/sanfrancisco - 10k - Cached - More from this site

802

1. Four Seasons Hotel San Francisco: A Luxury Hotel in San Francisco, California
   (San Francisco, California) Four Seasons is the world's leading operator of luxury hotels and resorts. Visit
   our site to plan your vacation, getaway, or business travel to San Francisco, CA....
   757 Market Street, San Francisco - Map - (415)633-3000 - Send to Phone - Weather
   www.fourseasons.com/sanfrancisco -

806

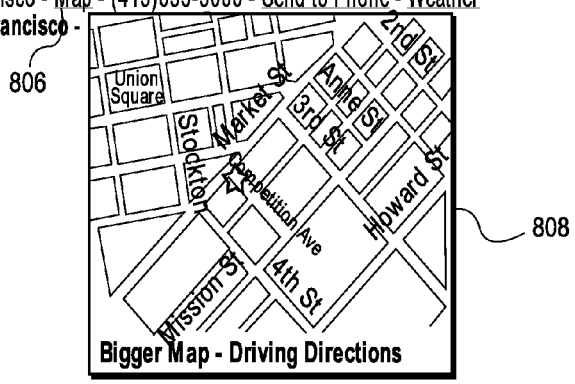

808

1. Four Seasons Hotel San Francisco: A Luxury Hotel in San Francisco, California
   (San Francisco, California) Four Seasons is the world's leading operator of luxury hotels and resorts. Visit
   our site to plan your vacation, getaway, or business travel to San Francisco, CA....
   757 Market Street, San Francisco - Map - (415)633-3000 - Send to Phone - Weather
   www.fourseasons.com/sanfrancisco - 10k - Cached - More from this site

1. Four Seasons Hotels and Resort🖃   (NYSE:FS)
   ... luxury hotel chain ... the highest standards of hospitality, Four Seasons invented luxury for the modern traveller ....
   Category: Hotels  Local: Find a Four Seasons Hotel near you
   www.fourseasons.com - 12k - Cached - More from this site - Save - Block
                                                902

FIG. 9

ACTIVE ABSTRACTS

RELATED APPLICATIONS

This Application is related to U.S. Provisional Application No. 60/627,254, entitled SEARCH SYSTEM PRESENTING ACTIVE ABSTRACTS INCLUDING LINKED TERMS, filed on Nov. 11, 2004 (hereinafter the "'254 provisional").

This Application is related to U.S. Provisional Application No. 60/627,189, entitled DOCUMENT NAVIGATION BY ACTIVE ABSTRACTS, filed on Nov. 11, 2004 (hereinafter the "'189 provisional").

This Application claims priority as a continuation-in-part of U.S. patent application Ser. No. 11/150,045, entitled SEARCH SYSTEM PRESENTING ACTIVE ABSTRACTS INCLUDING LINKED TERMS, filed on Jun. 10, 2005, which claims priority to the '254 provisional and to the '189 provisional.

This Application claims priority as a continuation-in-part of U.S. patent application Ser. No. 11/150,369, entitled DOCUMENT NAVIGATION BY ACTIVE ABSTRACTS, filed on Jun. 10, 2005, which claims priority to the '254 provisional and to the '189 provisional.

FIELD OF THE INVENTION

The present invention relates to generating search results and, more specifically, generating abstracts that contain non-traditional abstract links.

BACKGROUND

A search engine is a computer program that helps a user to locate information. To locate information on a particular topic, a user can submit to a search engine one or more search query terms related to the topic. In response, the search engine executes the search query and generates information about the results of the search. The information about the results of the search, referred to herein as the "search results", usually contains a list of the resources that satisfy the search query. The resources identified in the search results are referred to herein as "matching resources".

While search engines may be applied in a variety of contexts, search engines are especially useful for locating resources that are accessible through the Internet. Resources may include files whose content is composed in a page description language such as Hypertext Markup Language (HTML). Such files are typically called pages. Using a web browser, pages may be retrieved by selecting HTML links that contain the Universal Resource Locators (URLs) of the pages.

Depending on the query terms used and the number of pages that contain those query terms, search results may contain so many matching resources that a user may be overwhelmed when trying to determine which matching resources to investigate further. To assist a user in selecting one or more matching resources from a list, the search results may include a short description, or abstract, for each matching resource. By reading the abstract for a given matching resource, a user should be able to better determine whether the matching resource merits further investigation. Abstracts should be relatively short, so that a user may quickly judge the relevance of matching resources listed in the search results.

Various efforts have been made to improve the content of the abstracts that are presented to users. For example, one technique to improve the content of abstracts is described in U.S. patent application Ser. No. 10/365,273, entitled "GENERATING DESCRIPTIONS OF MATCHING RESOURCES BASED ON THE KIND, QUALITY, AND RELEVANCE OF AVAILABLE SOURCES OF INFORMATION ABOUT THE MATCHING RESOURCES", the contents of which are incorporated herein by reference. That application describes a technique for selecting the process which generates the abstract for a web page, from a plurality of available processes, based on the kind, quality, and relevance of the available sources of information about the page.

Another technique to improve the content of the abstracts is described in U.S. Pat. No. 6,711,567, entitled "DELIVERING NON-DEFAULT ITEMS IN ASSOCIATION WITH SEARCH RESULTS", the contents of which are incorporated by this reference. The "NON-DEFAULT" patent describes a technique for delivering search results pages to the users of a search engine, where one or more search result listings on the search results pages include items that are not included by default. The non-default items may take many forms, including but not limited to images, banners, controls, animations, and even applets in the JAVA language. The non-default items may be designed to entice the search engine users to select the search result listing with which they are associated over possibly higher-ranked search result listings that contain only default items.

The party that controls a web site may be pleased if the use of non-default items in the search results entices more users to visit the web site. However, the search engine user's experience is not necessarily improved. Therefore, it is desirable to provide techniques for making the contents of search result listing more useful to a user, thereby facilitating the user's search for useful information.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DESCRIPTION OF THE DRAWINGS

The present invention is illustrated by way of example, and not by way of limitation, in the figures of the accompanying drawings and in which like reference numerals refer to similar elements and in which:

FIGS. 2-9 are diagrams that illustrate examples of abstracts that may be generated using the techniques described herein.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Non-Traditional Abstract Links

Typically, search results include, for each matching resource, an abstract and a link. When selected, the link for a matching resource causes the browser to request the matching resource. When the matching resource is a web page, selection of the link causes the web page to be retrieved into the browser. If the web page is longer than will fit in the browser's window, then the top of the web page is displayed, and controls are provided that allow a user to scroll down to see more of the web page. Such links are referred to herein as "traditional abstract links".

Figure 2:
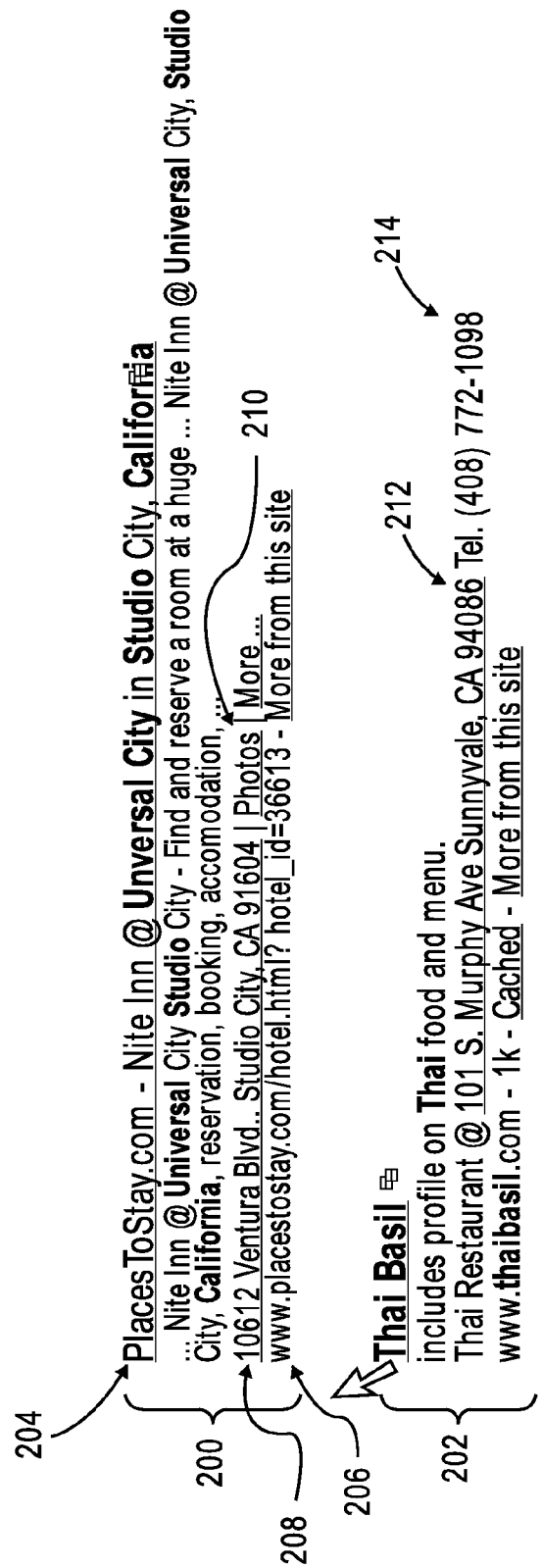

Referring to FIG. 2, it illustrates a search result listing that includes two abstracts 200 and 202. The abstract 200 includes a heading 204, which, when selected, activates a traditional abstract link to retrieve the matching resource. Abstract 200 also displays the URL 206 of the matching resource. Similar to heading 204, when URL 206 is selected, the matching resource is retrieved. Thus, both heading 204 and URL 206 are associated with the traditional abstract link of the matching resource associated with abstract 200.

Techniques shall be described hereafter for generating search results that include, instead of or in addition to the traditional abstract links, other links to contents that the user may consider helpful. These other links are referred to herein as "non-traditional abstract links". In general, the search engine generates non-traditional links in an attempt to anticipate the "next move" by the search engine user. By selecting a non-traditional abstract link from the abstract of a matching resource, the user is able to navigate from the search result listing directly to locations other than the top of a matching resource. Various examples of non-traditional abstract links, and techniques for generating abstracts that contain such links, shall be described in detail hereafter.

Referring again to FIG. 2, abstract 200 includes an address 208 and the word "Photos" 210. Each of these items is "active" in that selecting the item activates a link. However, unlike heading 204 and URL 206, selection of address 208 or "Photos" 210 will activate a non-traditional abstract link, as shall be described in greater detail below.

When displayed as part of the abstract of a matching resource, non-traditional abstract links may or may not be visibly separate from the rest of the abstract. For example, some non-traditional abstract links (such as the link associated with address 212 in abstract 202) may simply appear as text, within the textual body of the abstract. On the other hand, some non-traditional abstract links (such as those associated with address 208 and "Photos" 210) may appear separate from, but in the vicinity of, the textual body of the abstract. Yet other non-traditional abstract links may be displayed in a manner that does not visibly convey the relationship between the non-traditional abstract links and the textual body of the abstract.

Activating Non-Traditional Abstract Links

When a link is included in a web page, the link itself may or may not be visible to a viewer of the web page. For example, a web page display may anchor text which, when selected, causes the corresponding link to be activated. The text that causes the link to be selected may be entirely different than the text of the link itself. For example, the link may be www.findanewcar.com but the text that activates the link may be "My Favorite Car Site". Similarly, the web page may contain a non-textual control, such as a button or image which, when selected, activates the link. Thus, in the descriptions that follow, an abstract that includes non-traditional search links does not necessarily display the text of the link itself.

As mentioned above, non-traditional abstract links may be included in the abstract associated with a matching resource to provide the search engine user direct access to potentially helpful information. To view the information associated with a non-traditional search result link, the user must perform some action to activate the non-traditional abstract link.

According to one embodiment, a non-traditional abstract link is activated in the same manner as a traditional abstract link. Specifically, the user selects the link by clicking anchor text that is displayed in association with the link. Most browsers will display such anchor text in a manner that distinguishes the anchor text from other text that is not associated with a link. For example, many browsers will display text that is associated with a link using a blue underlined font.

In alternative embodiments, a non-traditional abstract link is activated in a non-traditional manner. For example, in one embodiment, a non-traditional abstract link is activated by merely "hovering" the cursor over the text associated with the link. Specifically, if the location of the cursor remains in a region of the display screen associated with the link for more than a predetermined threshold of time, the link is activated.

As another example of how a non-traditional abstract link may be activated, hovering over the link may cause a user interface control to appear next to the text. Once the user interface control appears, the user may "hover" the cursor over the user interface control to activate the link. Alternatively, after the user interface control appears, the user may have to click on the user interface control to activate the link.

Mid-Document Links

As mentioned above, traditional abstract links allow the user to navigate from the search results directly to the top of a matching resource, such as a web page. Unfortunately, the part of the web page in which the user is interested may be far from the top of the web page. Consequently, even though the traditional abstract link helps the user to retrieve a web page that contains relevant content, finding the relevant content within the web page may still be cumbersome.

According to one embodiment, search results are generated with mid-document links. Selection of a mid-document link causes a browser not only to retrieve a matching resource, but to jump to a particular location within the resource. Including mid-document links in the abstract for a matching resource is particularly useful if the matching links will take the user to the location of content that will be relevant to the user.

The terms used in the search query performed by a user is an indication of what the user considers to be relevant. Thus, the portion of a matching document that contains those search terms has a relatively high likelihood of being relevant to the user. Therefore, according to one embodiment, the abstract associated with a matching resource is generated to include a mid-document link to the portion of the matching resource that contains the terms that were used in the search query.

A mid-document link identifies an "anchor" within a web page. When a browser retrieves a web page based on a mid-document link, the browser locates the portion of the web page to display by searching for the anchor identified in the mid-document link. However, a web page may not have an anchor embedded at the location contains the terms that match a search query. Therefore, in one embodiment, the search engine:

identifies a matching resource based on the search query, embeds an anchor in the matching resource at the location within the matching resource that contains terms that match the search query, generates a mid-document link which, when selected, will cause a browser to retrieve the matching resource and to automatically jump to the location of the embedded anchor, and sends, as part of the search results, an abstract for the matching resource, where the abstract includes the mid-document link.

U.S. patent application Ser. No. 11/150,369, entitled DOCUMENT NAVIGATION BY ACTIVE ABSTRACTS, filed on Jun. 10, 2005, which has been incorporated herein by reference, describes in greater detail the generation and use of mid-document links within abstracts that are provided with search result listings.

In the example given above, the mid-document links are links to the location, within the matching resource, of terms that matched the search query. However, mid-document links are not limited to links to the location of matching search terms. Rather, mid-document links may be included in the abstract of a matching resource to allow the search engine user to immediately jump to the location within the matching resource of content of interest. Thus, in one embodiment, the abstract of a web page that has section headings may be constructed to include a mid-document link to each section heading.

Referring again to FIG. 2, address 208 and "Photos" 210 may be mid-document links. Abstract 200 may be associated with a matching resource that includes an address and photos. In this case, address 208 may have been extracted by the search engine from the matching resource. In constructing the abstract 208, the search engine uses the address 208 as anchor text for the mid-document link to the location, within the matching resource, from which address 208 was extracted. Similarly, Photos 210 may be the anchor text for a mid-document link to the location, within the matching resource, of the digital images.

As described in more detail in the related applications, a cached version of a matching resource may be used to implement the mid-document links. The cached version of the matching resource may be modified by the search engine to embed anchors for the mid-document links without modifying the version of the matching resource that resides at its original source.

Promoted Links

According to one embodiment, techniques are provided for including "promoted links" within the abstracts that are provided with search result listings. Unlike a traditional search result link, selection of a promoted link does not cause retrieval of the matching resource associated with the abstract in which the promoted link resides. Rather, a promoted link is a link that either (1) is contained within the matching resource, or (2) is contained within a resource to which the matching resource is directly or indirectly linked.

For example, assume that a web page A includes a link to a web page B, and that web page B includes a link to a web page C. Assume further that web page A is a matching resource for a particular search query. The abstract for web page A in the search results for that particular query may include a link to web page B and/or a link to web page C. In this example, the links to web pages B and C, within the abstract for web page A, are promoted links.

U.S. patent application Ser. No. 11/150,045, entitled SEARCH SYSTEM PRESENTING ACTIVE ABSTRACTS INCLUDING LINKED TERMS, filed on Jun. 10, 2005, which has been incorporated herein by reference, describes in greater detail the generation and use of promoted links within abstracts that are provided with search result listings.

The search engine may incorporate sophisticated logic to determine which links to promote to an abstract. For example, assume that a particular page about digital cameras is a matching resource in a search for digital cameras. In this case, the matching resource may itself have several links to web pages about specific digital cameras. According to one embodiment, the search engine determines which of those digital cameras are the "most popular", and promotes only the links to the most popular of the digital cameras.

As another example, assume that a web page about specific digital camera is a matching resource in a search for digital cameras. In this case, the matching resource may contain a link to a web page that has several links to web pages about specific digital cameras. As in the example give above, the search engine may determine which of those digital cameras are the "most popular", and promote only the links to the most popular of the digital cameras. Unlike the previous example, in this example, the promoted links are to web pages that are two levels below the resource that matched the actual search.

Another kind of "promoted link" is a link to a more general page on the same site. For example, the abstract for a page, from a particular site, about a specific digital camera could include a link to the page, from that particular site, about digital cameras in general, or a page about other digital cameras within the same price range or from the same manufacturer.

Referring again to FIG. 2, address 208 may not appear within the matching resource at all. Companies frequently put their address on a "Contact Us" page that is one or more levels below their home page. Thus, the non-traditional abstract link associated with address 208 may be included in abstract 208 as a result of being promoted from the Contact Us page.

Similar Subject Matter Links

According to one embodiment, techniques are provided for including "similar subject matter links" within the abstracts that are provided with search result listings. Unlike a promoted link, a similar subject matter link need not be a link within a matching resource, nor within any resource to which the matching resource is linked. For example, the search result listing for a particular search query may include an abstract for a particular web page about Australia. That particular web page may not include any links at all. However, due to the similarity of subject matter, the search engine may include, in the abstract for the web page about Australia, a link to another web page about kangaroos.

As another example, the search result listing for a particular search query may include an abstract for a web page that describes "bar tables". Frequently, people interested in information about bar tables will also be interested in information about "bar stools". Thus, the search engine may include, within the abstract of the web page for bar tables, a non-traditional abstract link to a different page for bar stools, even though the page for bar tables does not include a link to that particular page about bar stools.

Referring again to FIG. 2, the Nite Inn web page associated with abstract 200 may not actually have any photographs. Thus, "Photos" 210 may be the anchor text for a similar subject matter link which, when activated, retrieves a web page, other than the Nite Inn web page associated with abstract 200, that includes photographs of the Nite Inn.

Value Added Service Links

According to one embodiment, techniques are provided for including "value added service links" within the abstracts that are provided with search result listings. Similar to a similar subject matter link, a value added service link need not be a link within a matching resource. Rather, value added service links are links which, when selected, invoke services that generate output based, in part, on information relating to the matching resource.

For example, the search result listing for a particular search query may include an abstract for a particular web page about a hotel. The hotel's web page may include the address of the hotel. Under these circumstances, the search engine may include, in the abstract for the hotel's web page, a link which, when activated, sends the hotel's address to a web site that uses the hotel's address to generate a map of the vicinity around the hotel's address.

As another example, the hotel's web page may include a phrase that is in a foreign language, and that phrase may be included in the abstract for the hotel's web page. Under these circumstances, the search engine may include, in the abstract for the hotel's web page, a link which, when activated, sends the foreign language phrase to a web site that translates the foreign language phrase to English. In this example, the search engine may construct the abstract in such a way that selection of the foreign language phrase activates the link to the translation service.

In addition to or instead of value added service links, the search engine may include, in the abstract, value added information. Value added information is similar to value added links, except that it is not presented as a link which, when activated, retrieves additional information. Value added information may include, for example, phone numbers and addresses, and controls associated with different ways to sort/filter the results page. The value added information may or may not exist in the content of the matching resource. For example, a company's home page may not have a phone number for the company. However, the phone number of a company may be useful to a user. In one embodiment, the search engine provides information about the company to a phone directory service, and receives from the directory service a phone number for the company. When constructing the abstract for the company, the search engine may include the phone number in the abstract.

The search engine may invoke the phone directory service to obtain the phone number in response to receiving the search query. Alternatively, the search engine may invoke the phone directory service ahead of time, and store the phone number in metadata associated with the company web page. In the latter case, the search engine may read the phone number from the metadata when constructing the abstract in response to a particular query.

Referring again to FIG. 2, address 208 may be associated with a value added service link which, when selected, sends address information to a service that will generate a map of the vicinity around the address.

Related Search Links

According to one embodiment, the search engine may include, in the abstract for a particular web page, a link which, when activated, initiates another search. The search that is initiated by such an embedded "related search link" may use terms extracted from the web page represented by the abstract, and/or terms not necessarily from the web page, but which are related to the content of the web page. For example, the search engine may include, in the abstract for a hotel's web page, a link which, when activated, initiates another search for reviews of that particular hotel.

The search terms used by the related search link may take into account both the original search terms (which resulted in the display of the abstract that contains the search link) and terms related to the content of the web page represented by the abstract. For example, assume that the original search used the terms "hotels San Jose California". The matching resources for that search may include a web page for a Hotel X. In constructing the abstract for the Hotel X web page, the search engine may include a link which, when activated, initiates a search based on the terms "Hotel X San Jose California reviews".

Responding to Selection of Non-Traditional Abstract Links

As mentioned above, instead of or in addition to the traditional abstract link, the search engine may embed non-traditional abstract links within the abstract of a matching resource so that the user of the search engine may directly retrieve relevant information. When such a link is selected, the corresponding information may be presented to the user in a variety of ways.

According to one embodiment, when a non-traditional abstract link is selected, the resource associated with the link is retrieved, and that resource is displayed by the browser in a manner that replaces the search results page that contained the abstract. In such an embodiment, the selection of the non-traditional abstract link causes a similar operation as selection of most other types of links.

According to an alternative embodiment, selection of a non-traditional abstract link does not cause the web page containing the abstract to be replaced. Instead, selection of the link causes an HTML overlay to be displayed, where the HTML overlay contains information from or about the resource associated with the link. The overlay itself may contain links which, when selected, cause the corresponding resource to be displayed in place of the web page that contains the abstract.

The information contained in the overlay may provide the user sufficient information to make it unnecessary to retrieve the entire resource associated with the link. For example, the abstract may be for a hotel's web page, the non-traditional abstract link may be to a page that contains a review of the hotel, and the overlay for the link may contain the first few lines of the review and a rating of the hotel. In many cases, the first few lines of the review and the rating of the hotel will be all that the user desires to see.

Even if the information contained in the overlay is not sufficient in and of itself, it may provide the user information to help the user decide whether retrieving the resource would be worthwhile. If the user decides, based on the information presented in the overlay, that retrieval of the entire resource associated with the link is desirable, then the user may select the link from within the overlay. As mentioned above, there are many ways in which the link may be selected, and the techniques described herein are not limited to any particular link selection technique.

An HTML overlay is merely one example of a technique for displaying information associated with non-traditional abstract links without replacing the search results page. Other examples include windows generated by embedded JAVA applets, pop-up windows, etc.

Selecting Which Non-Traditional Abstract Links to Include

In the examples given above, the search engine determines which non-traditional abstract links to include in the abstract of a matching resource. According to one embodiment, the search engine maintains metadata that dictates which non-traditional search links to include in the abstract of a matching resource. This metadata is referred to herein as "link inclusion metadata".

In one embodiment, the link inclusion metadata maps (1) data that identifies a resource (such as a URL) to (2) data that indicates the non-traditional abstract links to include in the abstract for that resource. In such an embodiment, when a resource matches a search query, the search engine searches the link inclusion metadata based on the URL, and generates an abstract that includes the non-traditional abstract links that are mapped to that URL.

The link inclusion metadata may be any form of metadata, used by the search engine, to determine which non-traditional abstract links to include in the abstract of a resource. In a simple case, the link inclusion metadata for a resource may expressly identify a link to include in the abstract for the resource. In other cases, the link inclusion metadata may include a fragment of a link, where the search engine generates the entire link based on the fragment of the link and the search query. In yet other cases, the link inclusion metadata may specify rules for generating non-traditional abstract links for a particular resource. The search engine may dynamically generate the non-traditional abstract links, based on the specified rules, at the time the abstract is being generated in response to a specific search query.

Category-Based Selection of Non-Traditional Abstract Links

According to one embodiment, the type of links that a search engine includes in the abstract for a matching resource depends on the nature of the matching resource. For example, the search engine may embed a link to a "reviews" site within the abstract for the web page of a hotel. However, it does not necessarily make sense to embed a link to a "reviews" site into the abstract for a web page that simply explains how to perform basic arithmetic.

According to one embodiment, the link inclusion metadata maps resources to categories, and categories to rules about which non-traditional abstract links to include. In such an embodiment, when a resource matches a search query, the search engine determines the source of the resource, and then determines the category to which that source belongs. Based on the category, the search engine determines which rules should dictate what links to embed in the abstract for that matching resource.

"Auction Sites" is an example of a category. The search engine may store metadata that includes a list of all auction sites. When the page from an auction site matches a search query, the search engine chooses what links to embed in the abstract for the web page based on the fact that the web page is for an auction site. In the auction site example, the matching resource may be a web page for a specific auction of a specific product. Based on the fact that the web page is from an auction site, the search engine may include in the abstract for the web page a link to a web page for all auctions that relate to that type of product. In fact, the search engine may include several links, where each link sorts the auctions for that type of product using a different sort criteria (e.g. ending time, price, etc.)

The link inclusion metadata may specify a completely different set of rules for different categories of sites. For example, for "Personal Web Page" sites, the search engine may simply embed mid-document links to the terms that matched the search query. For "Company Home Page" sites, the search engine may embed value-added links to map-generating sites. For "Entertainment Source" sites, the search engine may embed value-added links to "review" web sites. These are merely a few examples of how, through metadata that categorizes the sources of searchable resources, the search engine may apply source-specific rules about what links to embed in the abstracts of matching resources.

Two-Phase Selection of Non-Default Items

According to one embodiment, the selection of which non-default items (including but not limited to non-traditional abstract links) to include in an abstract for a resource is performed in two phases. In the first phase, the search engine identifies a set of "candidate items" based on metadata associated with the resource. In embodiments that make use of non-traditional abstract links, the candidate items may include several non-traditional abstract links.

In the second phase, a subset of those candidate items is selected based on the search query that matched the resource. Because the subset is selected based on the search query, the abstract for a particular web page may include one set of non-default items when provided as the search results for one query, and may include an entirely different set of non-default items when provided as the search results for a different query.

In embodiments that make use of non-traditional abstract links, the specific non-traditional abstract links that are included in the abstract for a particular web page will vary based on the search query. In one embodiment, the link inclusion metadata associated with a particular resource may indicate (1) several candidate non-traditional abstract links and (2) selection criteria for each of the candidate non-traditional abstract links. For example, the link inclusion metadata for a web page about electronic devices may include:

a link to a web page about cell phones, associated with the term "cell phone";

a link to another web page about electronic devices; and a link to a web page about digital music player, associated with the term "digital music".

The search engine selects which of these three candidate non-traditional abstract links to include in the abstract for the matching resource based on the search query. For example, if the search query includes the term "cell phone", then the search engine may select the link to the web page about cell phones, and the link to the other web page about electronic devices. On the other hand, if the search query includes the term "digital music", then the search engine may select the link to the web page about digital music players, and the link to the other web page about electronic devices.

Once the subset of candidate items is selected in this manner, the abstract for the matching item is generated to include only the selected subset of candidate items. Using this technique, the non-traditional abstract links that are included in the abstract for any given matching resource are customized to the likely interests of the search engine user to which they will be presented.

As another example of the two-phased selection of non-traditional abstract links, assume that the matching resource is a web page that has information about the motorcycle laws for every state in the United States of America. The candidate items may include, for each state, a mid-document link to the information that applies to that specific state. In this example, the selection criteria for each of the mid-document links may be the name of the state. Thus, if the abstract is displayed in response to a search for "California motorcycle laws", then the abstract will include a mid-document link to the section of the document that applies to California. On the other hand, if the abstract is displayed in response to a search for "New York motorcycle laws", then the abstract will include a mid-document link to the section of the document that applies to New York.

Figure 1:
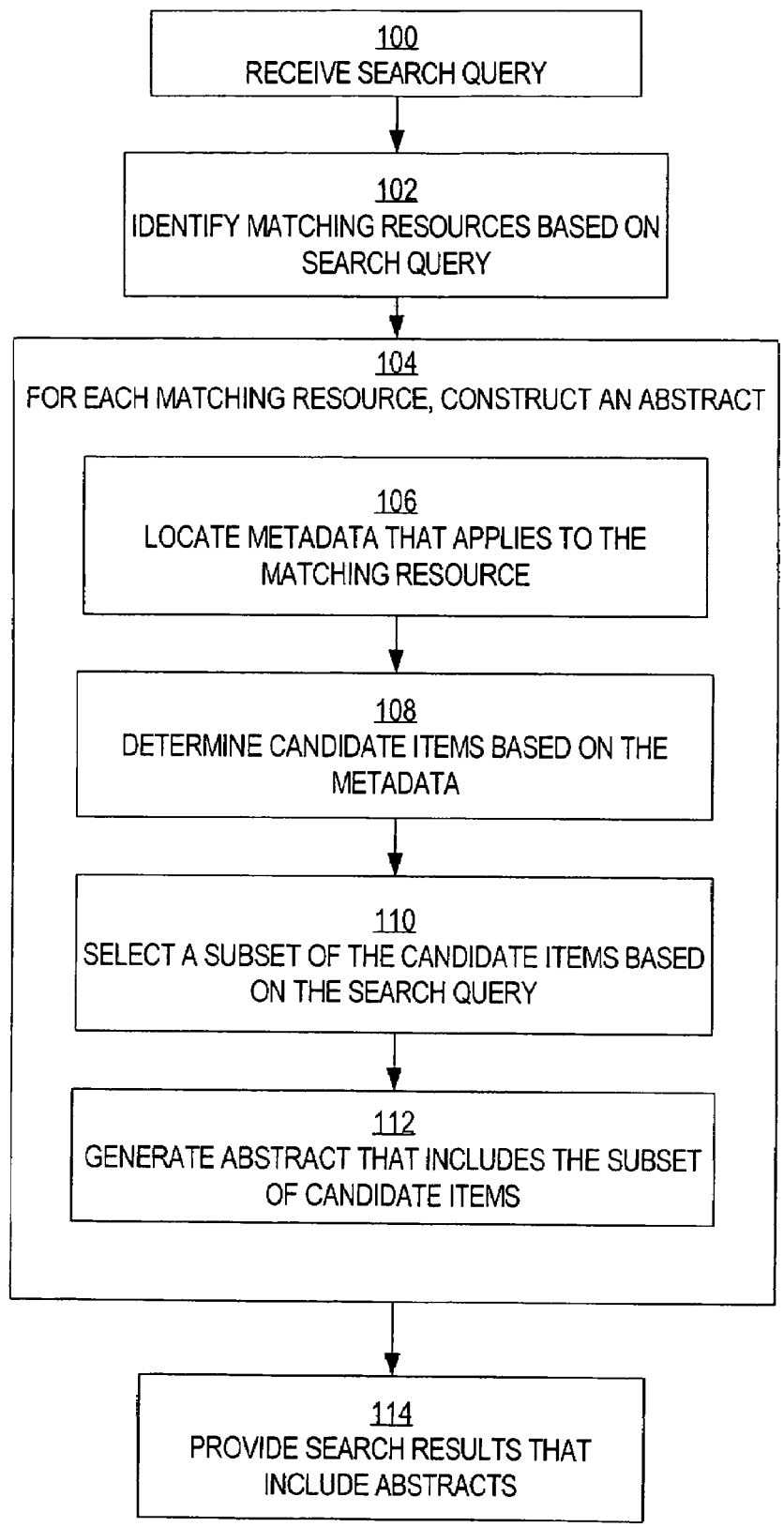
FIG. 1 is a flowchart that illustrates a two-phase process for selecting which non-traditional abstract links to include in an abstract, according to an embodiment of the invention.

FIG. 1 is a flowchart showing the steps involved in the two-phase selection of non-default items. Referring to FIG. 1, at step 100 a query is received by the search engine. At step 102, the search engine identifies matching resources based on the search query. At step 104, the search engine constructs an abstract for each matching resource. The abstract is constructed based both on metadata associated with the resource, and the search query itself.

Specifically, in one embodiment, step 104 involves locating the metadata that applies to a matching resource (step 106) and determining candidate items based on the metadata (step 108). The candidate items may include many types of non-default items, including one or more non-traditional abstract links. At step 110, a subset of the candidate items are selected based on the search query. At step 112, the search engine generates an abstract that includes the subset of candidate items.

At step 114, the search engine provides to the user search results that include the abstracts generated in step 104.

Filtering Criteria

As described above, the second phase of the two-phase selection process selects a subset of the non-default items associated with a matching resource. Thus, the second phase "filters" the candidate items based on some criteria. In the example given above, the criteria relates to the terms used in the search query to which the search engine is responding. However, the search query terms are merely one example of the criteria by which the search engine may filter the candidate items.

According to one embodiment, the search engine filters the candidate items based, at least in part, on information that the search engine knows about the user that submitted the search query. For example, the search engine may be part of a service for which users register. As part of the registration process, users provide profile information about themselves. When determining which candidate items to filter, the search engine may inspect the profile information for the user that submitted the search query, and filter the candidates based on the information contained therein.

For example, the profile information for a particular user may indicate that the user has a strong interest in digital photography. A search performed by the user may match a web page that is about several different types of electronic devices. Based on the profile information for the user, the search engine may limit the non-default items that are included in the abstract for the web page to those that relate to digital photography. The resulting abstract may include, for example, a mid-document link to jump directly to the location within the web page that relates to digital cameras.

As another example, the profile information for a particular user may indicate that the user resides California. A search performed by the user may match a web page that is about state flags. Based on the profile information for the user, the search engine may limit the non-default items that are included in the abstract for the web page to those that relate to the state flag of California. The resulting abstract may include, for example, a related subject matter link to a different site that focuses more particularly on the state flag of California.

Generating Link Inclusion Metadata

As mentioned above, the search engine determines which non-traditional abstract links to include in an abstract based on link inclusion metadata. The link inclusion metadata may come from a variety of sources. For example, in one embodiment, the link inclusion metadata for a resource is generated based on information included in the resource itself. For example, the designer of a web page may include, in the web page itself, information about which non-traditional links to include in the abstract for the hotel's web page. That information, referred to herein as "abstract links hints" may, for example, be demarcated within the web page by specified tags. The search engine may find the abstract links hints based on the tags, and generate the link inclusion metadata for that particular web page based on the abstract links hints. Rather than have a separate abstract links hint section in a resource, the resource may simply use special tags to identify those links, within the resource, that should be promoted to the abstract for the resource.

In another embodiment, the party that controls a web page may provide link inclusion information directly to the party that controls the search engine. For example, the party that manages a hotel's web page may provide to the party that manages the search engine instructions about which non-traditional abstract links to include in the abstract for the hotel's web page. Base on the information provided by the web page manager, the search engine manager may generate the link inclusion metadata for that particular web page.

When link inclusion information is provided by the owner of the resource, the link inclusion information may call for more non-traditional abstract links than the search engine provider considers appropriate. Under these conditions, the search engine may be configured to include no more than a specified maximum number of non-traditional abstract links, even though the link inclusion metadata may call for more.

In another embodiment, the party that controls the search engine analyzes each resource, and based on the manual analysis, generates the link inclusion metadata for the resource. Because such manual analysis may be more time consuming than other techniques for generating the link inclusion metadata, the use of manual analysis may be limited to only the resources that most frequently appear in search results.

In yet another embodiment, the search engine is not expressly provided link inclusion information. Instead, the search engine parses a resource, and applies logic to determine the link inclusion metadata for the resource based on the content of the resource. This parsing may be performed, for example, at the time the resource is indexed by the search engine. As mentioned above, the search engine may take into account the category of a resource when generating the link inclusion metadata for the resource. For example, the generation of link inclusion metadata for an auction web site may be based on different logic than the generation of link inclusion metadata for a company web site.

Information about the category of a resource may be expressly provided to the search engine. The specific link inclusion metadata for the resource is then automatically generated by the search engine based on the logic associated with the specified category, and the contents of the resource itself.

The category of a resource is merely one example of information that may be used by a search engine in generating the link inclusion metadata for the resource. As another example, the search engine may be provided "link popularity information". Link popularity information is information about how frequently links have been selected by users. Various approaches may be used to obtain link popularity information, and the present techniques are not limited to any particular approach for obtaining link popularity information. Link popularity information may be used by the search engine, for example, to determine which links within a resource are most frequently followed. Based on this determination, the search engine may generate link inclusion information for the resource that identifies the N most popular links within the resource. Based on this link inclusion information, the search engine may generate an abstract for the resource that includes the N most popular links within the resource.

It should be noted that the various techniques for generating link inclusion metadata that are described herein are not mutually exclusive. Rather, they may be mixed and combined as needed for any given implementation. For example, for any given resource, the link inclusion metadata may be generated based on (1) information specially demarcated within the resource, (2) link inclusion information provided by the owner of the resource, and (3) logic applied by the search engine to the contents of the resource, based on both link popularity information and resource category information.

Illustrative Examples

FIGS. 2-9 illustrate abstracts that may be generated using the techniques described herein. While these examples demonstrate specific embodiments of how the techniques may be implemented, the techniques are not limited to the specific embodiments thus illustrated.

FIG. 2 illustrates an abstract 200 in which selection of address 208 may activate a value added link that causes a map, associated with the address, to be displayed. Selection of address 212 within the textual body of abstract 202 may cause a similar link to be activated. The telephone number 214 within abstract 202 may be value added information that was retrieved from third-party service, and included in the abstract 202. In the illustrated example, the phone number 214 itself serves as anchor text for a non-traditional abstract link. The non-traditional abstract link associated with phone number 214 may, for example, invoke a third party service that causes the phone number 214 to be sent to the cell phone of the user. Alternatively, if the computer that is displaying the abstract 214 is configured to control a telephone, the non-traditional abstract link associated with phone number 214 may cause the telephone controlled by the computer to call the phone number 214.

Figure 3:

FIG. 3 illustrates abstracts 302 and 304 that may be generated when the matching resources contain structured content. In the example illustrated in FIG. 3, the structured content is from an auction site. Abstract 302 includes information 306, such as the ending date of the particular auction and the immediate purchase price for the particular auction, which has been promoted from the matching document into the abstract. In addition, abstract 302 includes links 308, 310 and 312 which retrieve a related web page (a web page that lists all auctions related to the same item), and causes the related web page to be sorted newly listed first, ending soonest first, and lowest price first, respectively. Abstract 302 also includes a related subject matter link 314 which, when activated, retrieves the web page associated with online stores that sell the same item.

Abstract 304 may be for the same matching resource as abstract 302, but does not contain the same information. The difference between abstract 304 and abstract 302 may result from the use of query-based selection of candidate items. Thus, because the query that caused generation of abstract 302 contained different terms than the query that caused generation of abstract 304, the abstracts are not identical.

Referring to FIG. 4, it illustrates three abstracts 402, 404 and 406 that may be generated using the techniques described herein. Abstract 404 includes a link 408 to a web page associated with the general category 408 to which the item described in the matching resource belongs. Abstract 404 also includes a link 410 to the more specific category to which the item described in the matching resource belongs. Links 404 and 408 may be promoted links from the matching resource itself, or from levels below the matching resource. Links 404 and 408 may have been selected for inclusion in abstract 404 because they had the highest "link popularity" values of all of the links associated with the matching resource.

Abstract 406 may be for the same matching resource as abstract 404, but does not contain the same information. The difference between abstract 406 and abstract 404 result from the use of query-based selection of candidate items. Thus, because the query that caused generation of abstract 404 contained different terms than the query that caused generation of abstract 406, the abstracts are not identical.

FIG. 5 illustrates two abstracts 502 and 504 that include various non-traditional abstract links. For example, abstract 502 includes "newly listed", "ending soonest" and "lowest price first" links which, when activated, retrieve a list of auctions on similar items, and sort the list in the manner indicated by the link.

FIG. 6 includes six examples of abstracts that may be generated using the techniques described herein. The first example abstract includes direct links to the most popular reviews of the item described in the matching resource. These review links may have been promoted from the matching resource, from levels below the matching resource, or they may simply be related subject matter links that have been associated with the matching resource.

Example 2 of FIG. 6 includes non-traditional abstract links to various locations within the web site associated with the matching resource. By activating such a link, the user is able to jump directly to a particular location within the matching resource, or to a different web page from the same site as the matching resource.

Example 3 of FIG. 6 is an example of "deep link extraction". Specifically, abstract includes a "digital cameras" link 602 that has been promoted from the matching resource. Activation of the digital camera link 602 causes the viewer to jump to a "digital camera web page" one level removed from the matching resource. In addition, the abstract includes links 604 about specific types of digital cameras. Links 604 have been extracted from the digital camera web page. Thus, activation of one of links 604 causes the viewer to jump two levels removed from the matching resource, to a web page about a specific type of digital camera.

Example 3 of FIG. 6 is also an example of an abstract generated by the two-phase technique described herein. Specifically, the matching resource is associated with many categories of products (digital cameras, camcorders, televisions, etc.). The link inclusion metadata for the resource may identify links for each of the categories, and links for specific products in each of the categories. The search engine determines which of those links to include in the abstract based on the search query to which the search engine in responding. In the present example, the search query included terms relating specifically to digital cameras. Consequently, the abstract is generated to include links to the web page associated with the digital camera category, and links to the web pages associated with specific types of digital cameras. If the search query had included terms relating to camcorders, then the links relating to digital cameras would not be included in the abstract. Instead, the abstract would include links to a web page associated with camcorders, and to web pages associated with particular types of camcorders.

Example 4 of FIG. 6 illustrates an abstract that includes a value added service link 606. When link 606 is activated, the link causes the browser to send an address in a request to a third-party mapping service. In response to the request, the third-party service generates a map for the address, and sends the map to the browser.

Example 5 of FIG. 6 illustrates an abstract that includes links to web sites that are related to the matching document. Specifically, the matching document is a web page about the prices of hotels near Studio Universal. The abstract in Example 5 includes links 608 which, when activated, retrieve web pages associated with specific hotels near Studio Universal. The anchor text for links 608 includes both the name of the specific hotels, and the prices thereof.

Example 6 of FIG. 6 illustrates an abstract associated with an auction web page. The abstract includes numerous links which, when activated, allow the user to jump immediately to web pages that may be of interest to the user. For example, the abstract shown in Example 6 includes links that allow the user to jump to the web pages associated with specific auctions of the item. The anchor text for those links indicate the time at which each of the corresponding auctions ends.

FIG. 7 illustrates an abstract associated with the web page of a restaurant. The abstract includes a value added service link which, when selected, submits the address of the restaurant to a mapping service. The mapping service, in turn, generates a map based on the address and returns the map to the browser. The abstract illustrated in FIG. 7 differs slightly from other mapping service examples, in that the anchor text for the link to the mapping service is "Map", rather than the address itself.

FIG. 8 illustrates various ways in which the information associated with a non-traditional abstract link may be presented to a user. Specifically, FIG. 8 illustrates an abstract with a "Weather" link 802. When the Weather link 802 is activated, the link causes the browser to send a request to a weather service site. In response to the request, the weather service site generates weather information, and sends the whether information back to the browser. The browser then displays the weather information in an overlay 804 that does not cause the browser to stop displaying the abstract itself.

As mentioned above, non-traditional abstract links, such as Weather link 802, may be activated in a variety of ways. For example, Weather link 802 may be activated by hovering the cursor over the "Weather" anchor text, or by clicking on the "Weather" anchor text.

FIG. 8 also illustrates an abstract that includes a "Map" link 806. When the Map link 806 is activated, a mapping service is called, and the resulting map is presented to the user in an overlay 808.

Also shown in FIG. 8 is an abstract that includes a value added link 810 which, when activated, causes a URL, address and phone number to be sent to the cell phone of the user. In this example, hovering over the link 810 does not activate the link. Rather, hovering over the link 810 causes the display of an overlay 812 that indicates what will happen if the user activates the link 810.

FIG. 9 illustrates an example of an abstract that may be generated in response to a search query that specifies a particular hotel, but does not specify a particular location. To assist the user in locating the specified hotel at a specific location, the abstract includes a link 902 which, when activated, causes another search to be performed. However, unlike the original search, the search that will be performed when link 902 is activated searches through resources that are "local" relative to the user. Thus, link 902 is an example of a non-traditional abstract link that is included based, in part, on information that the search engine knows about the user (i.e. the user's location).

Interfaces for Displaying Meta Information

The interface design illustrated in FIGS. 2-9 should not be considered limiting relative to how metadata about a result may be displayed. For example, any one of a variety of user interfaces may be used to accommodate display of meta information. For instance, interfaces may be used which allow a user to directly perform the operation on the result site without leaving the search page. For instance, if the matching resource is a search engine page, the search engine might promote the search box into the abstract. As another example, if the result is a music page, then the search engine might promote the play button for a song into the abstract.

According to one embodiment, the user interfaces change as the user interacts with the page. For instance, if one particular result interests the user, then the search engine might actually change the user interface, and the entire results page, to now "expand" that result to show a rich set of metadata about that result, and the relationship of that result to the user query. In yet another embodiment, the metadata that is displayed is not fixed for a result or a result-query pair. Rather, the metadata may change for the same result and the same query based on how the user interacts with the page.

Active Abstracts for Things Other than Matching Resources

In examples given above, abstracts are generated by a search engine based on resources that match a search. However, displaying metadata and generating abstracts using the techniques described herein are not limited to the context of search results. For example, the techniques may be applied to define metadata and abstracts for the query itself. A query for instance, can have various senses. The techniques may be employed to provide a query summarization that tells the user that jaguar has many senses: cars, cats, operating system. How query-specific metadata is displayed is also an abstracting technique.

Another use of the active abstract generating techniques described herein involves result-set specific summarization. In result-set specific summarization, the abstracts and the metadata change based on the type of results that show up for a query. For instance, if the result set is very diverse, like in the jaguar example, if there are results about the car, cat and operating system all adjacent to each other, then the search engine might choose to show metadata that just highlights the broad category of the result. However, if the result set is uniform—(e.g. many or all of the results are about cats), then the search engine might select metadata that shows detailed in-depth differentiation—one page is a picture of jaguars in Africa (the search engine might choose to the pictures of the cat directly instead of links or words that describe the page), one page talks about biological ancestry of jaguars (the search engine might pull in reference data and biology resources as metadata) and perhaps one page is about show cats in Las Vegas. Thus, metadata selection criteria can also depend on what the other results look like.

Hardware Overview

Figure 10:
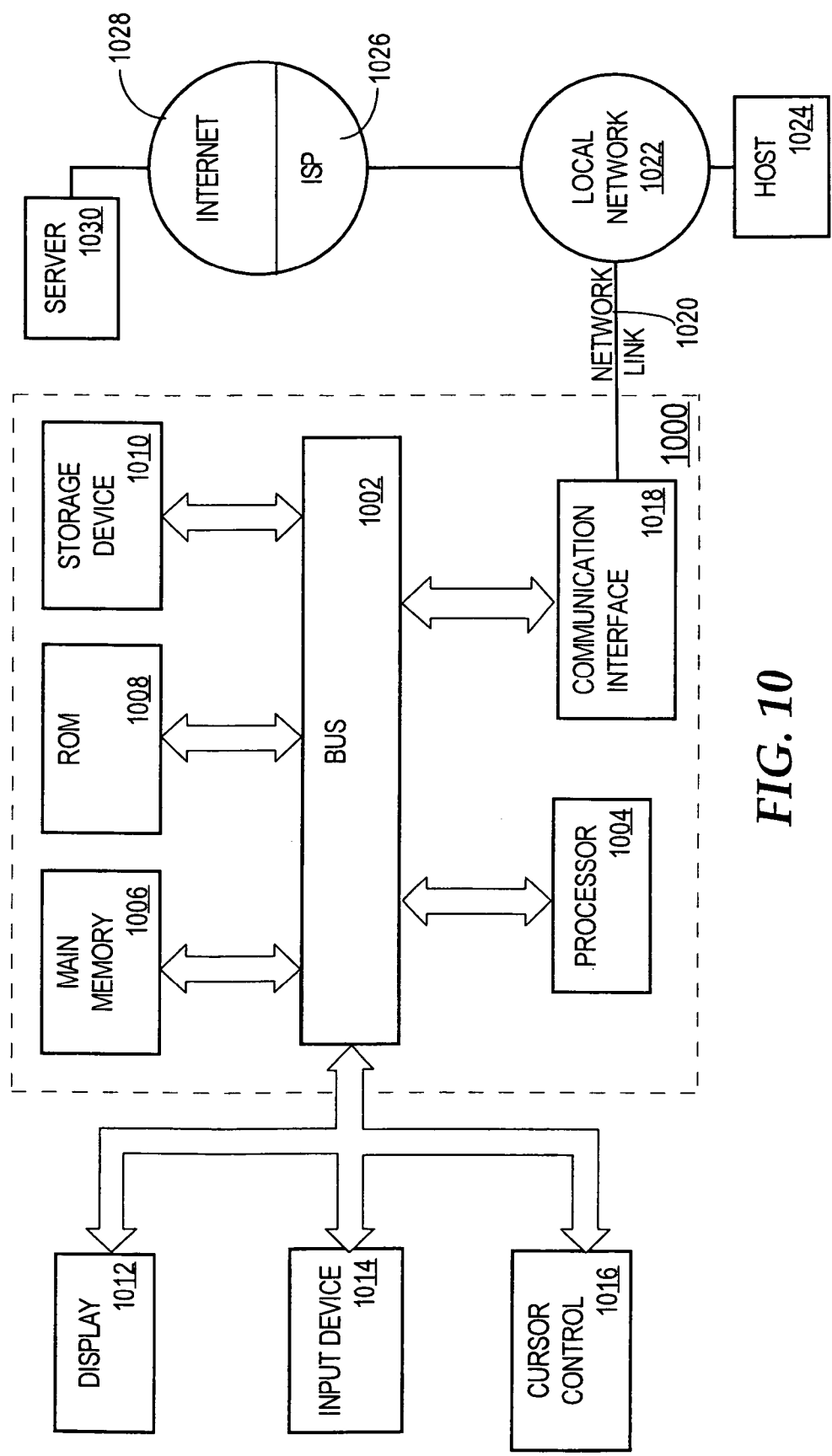
FIG. 10 is a block diagram of a computer system that may be used to implement the techniques described herein.

FIG. 10 is a block diagram that illustrates a computer system 1000 upon which an embodiment of the invention may be implemented. Computer system 1000 includes a bus 1002 or other communication mechanism for communicating information, and a processor 1004 coupled with bus 1002 for processing information. Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

The invention is related to the use of computer system 1000 for implementing the techniques described herein. According to one embodiment of the invention, those techniques are performed by computer system 1000 in response to processor 1004 executing one or more sequences of one or more instructions contained in main memory 1006. Such instructions may be read into main memory 1006 from another machine-readable medium, such as storage device 1010. Execution of the sequences of instructions contained in main memory 1006 causes processor 1004 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 1000, various machine-readable media are involved, for example, in providing instructions to processor 1004 for execution. Such a medium may take many forms, including but not limited to, non-volatile media, volatile media, and transmission media.

Non-volatile media includes, for example, optical or magnetic disks, such as storage device 1010. Volatile media includes dynamic memory, such as main memory 1006. Transmission media includes coaxial cables, copper wire and fiber optics, including the wires that comprise bus 1002. Transmission media can also take the form of acoustic or light waves, such as those generated during radio-wave and infrared data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other medium from which a computer can read.

Various forms of machine-readable media may be involved in carrying one or more sequences of one or more instructions to processor 1004 for execution. For example, the instructions may initially be carried on a magnetic disk of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data transmitted in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are exemplary forms of transporting the information.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution. In this manner, computer system 1000 may obtain application code.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of generating search results in response to a search query, the method comprising the steps of:
    based on the search query, identifying a plurality of matching resources, wherein the plurality of matching resources includes a particular resource;
    reading metadata associated with said particular resource, wherein said metadata indicates a plurality of candidate items to include in an abstract for said particular resource;
    based on filtering criteria, selecting a subset of candidate items from said plurality of candidate items;
    generating abstracts of each of said plurality of matching resources, wherein the abstract of said particular resource is generated to include the subset of candidate items that were selected based on the filtering criteria; and
    providing said abstracts as search results of said search query;
    wherein the subset of candidate items that are included in the abstract generated for the particular resource includes at least one or more selected from the group consisting of:
    a promoted link which, when activated, causes retrieval of content pointed to by a link that is either contained within the particular resource or is contained within a resource to which the particular resource is directly or indirectly linked by one or more links in the particular resource;
    a value added service link which, when activated, causes information to be sent to a service that is controlled by a party other than the party that controls the particular resource;
    a value added information item obtained by a search engine submitting information to a service that is controlled by a party other than the party that controls the particular resource and other than the party that controls the search engine, where that service processes the information;
    wherein the information is either (a) extracted from the particular resource or (b) about the party that controls the particular resource; and
    a mid-document link which, when activated, causes retrieval of the particular resource and also jumps to the particular location within the particular resource where content of interest is located, wherein the particular location is such that jumping to the particular location within the particular resource results in hiding the top of the particular resource;
    wherein the steps are performed on one or more computing devices.

2. The method of claim 1 wherein the step of selecting a subset based on filtering criteria includes selecting a subset based on terms in the search query.

3. The method of claim 1 wherein:
    the method includes reading information about the user that submitted the search query; and
    the step of selecting a subset based on filtering criteria includes selecting a subset based on the information about the user that submitted the search query.

4. The method of claim 1 wherein:
    said metadata indicates a plurality of candidate non-traditional abstract links to include in an abstract for said particular resource;
    the step of selecting a subset of candidate items from said plurality of candidate items includes selecting a subset of the candidate non-traditional abstract links from the plurality of candidate non-traditional abstract links; and
    the step of generating abstracts of each of said plurality of matching resources includes generating an abstract, for said particular resource, that includes the subset of candidate non-traditional abstract links that were selected based on the search query.

5. The method of claim 4 wherein the plurality of candidate non-traditional abstract links includes a mid-document link which, when activated, causes retrieval of the particular resource and also jumps to the particular location within the particular resource where content of interest is located, wherein the particular location is such that jumping to the particular location within the particular resource results in hiding the top of the particular resource.

6. The method of claim 4 wherein the plurality of candidate non-traditional abstract links includes a promoted link which, when activated, causes retrieval of content pointed to by a link that is either contained within the particular resource or is contained within a resource to which the particular resource is directly or indirectly linked by one or more links in the particular resource.

7. The method of claim 6 wherein the promoted link is not contained in, and promoted from at least one level below or above the particular resource.

8. The method of claim 4 wherein the plurality of candidate non-traditional abstract links includes a similar subject matter link that is not contained within the particular resource.

9. The method of claim 4 wherein the plurality of candidate non-traditional abstract links includes a value added service link which, when activated, causes information to be sent to a service that is controlled by a party other than the party that controls the particular resource, wherein the information is either (a) extracted from the particular resource or (b) about the party that controls the particular resource.

10. The method of claim 9 further comprising the search engine extracting from the particular resource the information related to the particular resource that is sent to said service.

11. The method of claim 9 wherein the service is a service that provides information based on an address, and wherein the information related to the particular resource is an address associated with an entity mentioned in the particular resource.

12. The method of claim 4 wherein the plurality of candidate items includes a value added information item obtained by a search engine by submitting information to a service that is controlled by a party other than the party that controls the particular resource and other than the party that controls the search engine, wherein the information is either (a) extracted from the particular resource or (b) about the party that controls the particular resource.

13. The method of claim 4 wherein the plurality of candidate non-traditional abstract links includes a related search link which, when activated, initiates a search with terms that are not identical to the terms of said search query.

14. The method of claim 13 further comprising the step of selecting the terms for said search based on both the terms of said search query and terms, not in said search query, that are associated with said particular resource.

15. A computer-readable storage medium storing one or more sequences of instructions which, when executed by one or more processors, causes the one or more processors to perform the method recited in claim 1.

16. A computer-readable storage medium storing one or more sequences of instructions which, when executed by one or more processors, causes the one or more processors to perform the method recited in claim 2.

17. A computer-readable storage medium storing one or more sequences of instructions which, when executed by one or more processors, causes the one or more processors to perform the method recited in claim 3.

18. A computer-readable storage medium storing one or more sequences of instructions which, when executed by one or more processors, causes the one or more processors to perform the method recited in claim 4.

19. A computer-readable storage medium storing one or more sequences of instructions which, when executed by one or more processors, causes the one or more processors to perform the method recited in claim 5.

20. A computer-readable storage medium storing one or more sequences of instructions which, when executed by one or more processors, causes the one or more processors to perform the method recited in claim 6.

21. A computer-readable storage medium storing one or more sequences of instructions which, when executed by one or more processors, causes the one or more processors to perform the method recited in claim 7.

22. A computer-readable storage medium storing one or more sequences of instructions which, when executed by one or more processors, causes the one or more processors to perform the method recited in claim 8.

23. A computer-readable storage medium storing one or more sequences of instructions which, when executed by one or more processors, causes the one or more processors to perform the method recited in claim 9.

24. A computer-readable storage medium storing one or more sequences of instructions which, when executed by one or more processors, causes the one or more processors to perform the method recited in claim 10.

25. A computer-readable storage medium storing one or more sequences of instructions which, when executed by one or more processors, causes the one or more processors to perform the method recited in claim 11.

26. A computer-readable storage medium storing one or more sequences of instructions which, when executed by one or more processors, causes the one or more processors to perform the method recited in claim 12.

27. A computer-readable storage medium storing one or more sequences of instructions which, when executed by one or more processors, causes the one or more processors to perform the method recited in claim 13.

28. A computer-readable storage medium storing one or more sequences of instructions which, when executed by one or more processors, causes the one or more processors to perform the method recited in claim 14.

29. The method of claim 1, further comprising:
receiving, from an owner of a particular resource, metadata that indicates a plurality of links to include within abstracts generated for the particular resource.

30. The method of claim 1, wherein the abstract generated for the particular resource includes a particular link to the particular resource.

* * * * *

UNITED STATES PATENT AND TRADEMARK OFFICE
CERTIFICATE OF CORRECTION

PATENT NO. : 7,606,794 B2 Page 1 of 1
APPLICATION NO. : 11/169521
DATED : October 20, 2009
INVENTOR(S) : Carson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 511 days.

Signed and Sealed this

Fourteenth Day of December, 2010

David J. Kappos
*Director of the United States Patent and Trademark Office*